United States Patent
Imaoka et al.

(10) Patent No.: US 6,350,376 B1
(45) Date of Patent: Feb. 26, 2002

(54) REDUCTIVE HEAT EXCHANGE WATER AND HEAT EXCHANGE SYSTEM USING SUCH WATER

(75) Inventors: Takashi Imaoka; Hiroshi Morita, both of Tokyo; Isamu Sugiyama, Atsugi; Tadahiro Ohmi; Masaki Hirayama, both of Sendai, all of (JP)

(73) Assignee: Organo Corporation, Tokyo (JP)

( * ) Notice: Subject to any disclaimer, the term of this patent is extended or adjusted under 35 U.S.C. 154(b) by 0 days.

(21) Appl. No.: 09/527,700

(22) Filed: Mar. 16, 2000

(30) Foreign Application Priority Data

Mar. 19, 1999 (JP) .......................... 11-075092
Nov. 30, 1999 (JP) .......................... 11-339665

(51) Int. Cl.$^7$ ........................... C02F 1/20; B01D 19/00
(52) U.S. Cl. .................... 210/198.1; 210/85; 210/96.1; 210/757; 422/14; 165/108; 423/580.1
(58) Field of Search .................... 422/14; 165/108; 210/85, 96.1, 143, 167, 198.1, 257.1, 258, 433.1, 434, 696, 757, 767; 423/580.1

(56) References Cited

U.S. PATENT DOCUMENTS

| | | | |
|---|---|---|---|
| 3,805,880 A | * | 4/1974 | Lawlar |
| 4,789,488 A | * | 12/1988 | Desilva ........................ 422/14 |
| 5,342,510 A | * | 8/1994 | Eden et al. ................. 210/96.1 |
| 5,593,554 A | | 1/1997 | Yamanaka et al. .......... 204/252 |
| 5,616,221 A | | 4/1997 | Aoki et al. .................. 204/252 |
| 6,000,420 A | * | 12/1999 | Nicholson et al. |
| 6,086,057 A | | 7/2000 | Mitsumori et al. ...... 261/122.1 |

FOREIGN PATENT DOCUMENTS

| | | | |
|---|---|---|---|
| JP | 50-35752 | * 11/1975 | .................. 422/14 |
| WO | WO98/08248 | 2/1998 | |

OTHER PUBLICATIONS

European Search Report dated Jan. 11, 2001 (3 pgs) for EP 0105741.
A copy of the English specification and drawings of the U.S. Patent Application No. of the National Phase of the PCT application: 09/242,601, 57 pages, Undated.
Ph. Berge and F. Nordmann, "PWR Secondary Water Chemistry and Corrosion", Proceedings vol. 1, Apr. 19–22, 1988, "JAIF International Conference on Water Chemistry in Nuclear Power Plants, Operational Experience and New Technologies for Management", Tokyo, pp. 22–31.

* cited by examiner

*Primary Examiner*—Joseph W. Drodge
(74) *Attorney, Agent, or Firm*—Rosenthal & Osha L.L.P.

(57) ABSTRACT

Heat exchange water for cooling an object of heat exchange such as machinery, air, or liquid, which serves to prevent oxidation and deterioration of metal materials used in pipes for supplying/circulating the heat exchange water or in the liquid ends of the heat exchanger, to suppress growth of algae and microorganisms, and to reduce influence on the environment. The heat exchange water is reductive water having zero or negative standard oxidation-reduction potential as determined on the basis of the hydrogen electrode standard.

13 Claims, 11 Drawing Sheets

REDUCTIVE HEAT EXCHANGE WATER AND HEAT EXCHANGE SYSTEM USING SUCH WATER

BACKGROUND OF THE INVENTION

1. Field of the Invention

The present invention relates to heat exchange water and a heat exchange system for performing heat exchange with respect to an object of heat exchange such as machinery, air, or liquid.

2. Description of the Background Art

Heat exchangers for cooling objects of heat exchange such as machinery, air, or liquid are widely used in factories and laboratories in many fields. Conventionally, in these heat exchangers, water such as city water and industrial water are employed as the heat medium for performing heat exchange because water is safe to handle, inexpensive, and suitable as a heat medium due to its high specific heat and high heat transfer rate.

Figure 11:
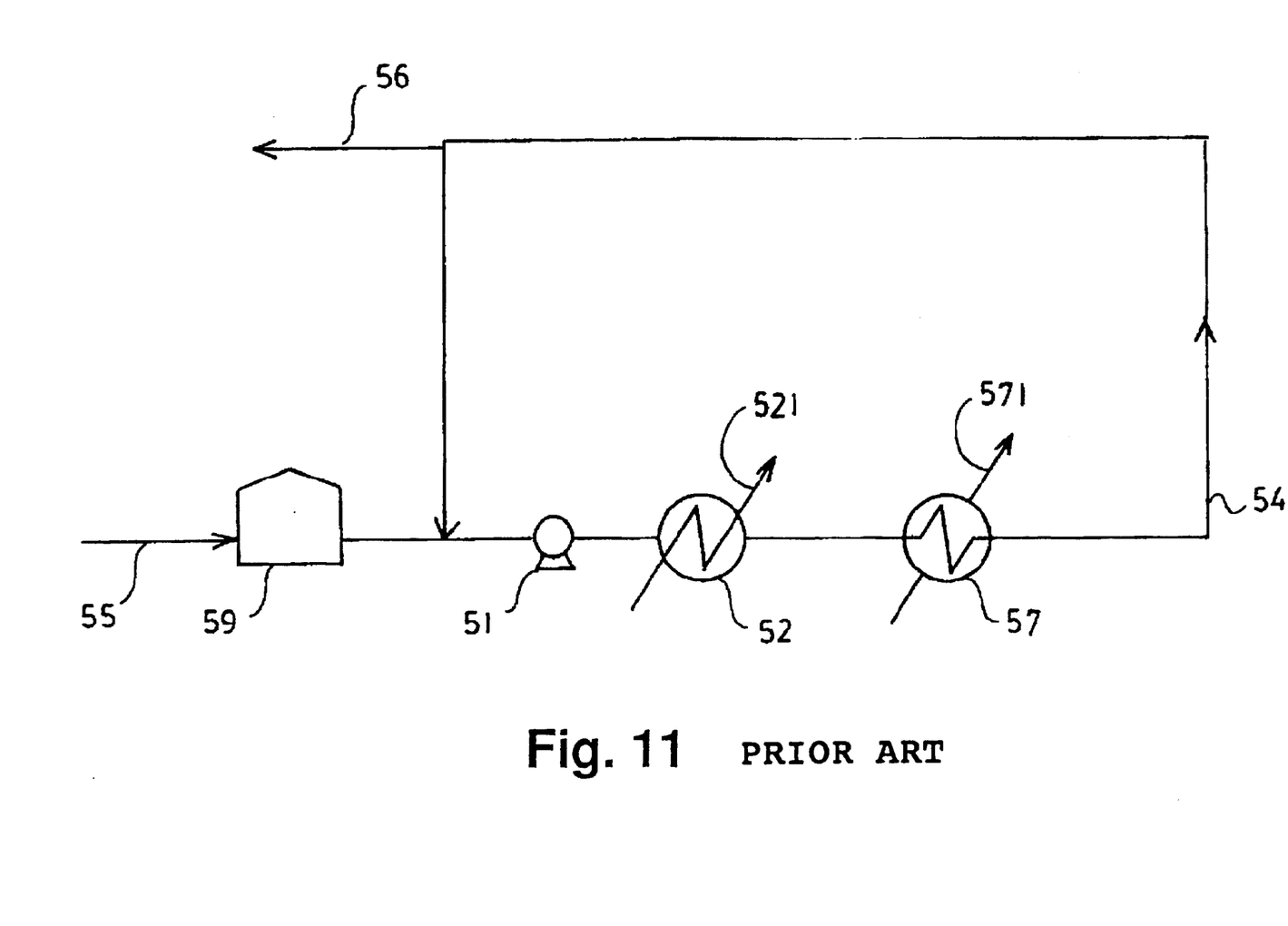
FIG. 11 illustrates a conventional heat exchange system.

Conventional systems for supplying the heat medium, namely, the heat exchange water, are configured as shown for example in FIG. 11. Specifically, the heat exchange water is forwarded by a circulating pump 51 to a cooler 52 that cools the heat exchange water using water 521. The heat exchange water is cooled in this cooler. The heat exchange water is sometimes hereinafter referred to as the cooling water. Subsequently, the cooled heat exchange water (cooling water) is forwarded to a cooling device 57, and is used for cooling an object of heat exchange 571 passing through the cooling device 57. The heat exchange water after being used for cooling is transferred back to the inlet side of the circulating pump 51 through piping 54 connecting thereto and forming a circulation system. When the quality of the heat exchange water degrades within this circulation system, the water is partially or completely discharged through a discharge pipe 56. Make-up water is then supplied to the circulation system after being treated in the pre-treatment device 59.

Heat exchangers using conventional water as the heat medium have the following shortcomings.

(1) Water used as the heat exchange water contains dissolved oxygen or oxidizers such as hypochlorous acid and sodium hypochlorite dissolved therein for sterilization. By the oxidizing effects of these components, metal materials used in the water supply piping system and the liquid ends of the heat exchanger become oxidized. As a result, (i) oxide films or, when aggravated, tumorous protrusions are formed in the liquid ends. This greatly decreases the heat exchange efficiency, and increases resistance in the piping system (heat exchange system) to impede flow of a specified quantity of heat exchange water. In addition, (ii) the thickness of metal liquid ends is decreased by oxidation and dissolution. The mechanical strength of these components is thereby lost, possibly causing a fracture in the components which leads to leakage of the heat exchange water. Furthermore, (iii) problems in the heat exchange system such as filter clogging occur because of the generation of so-called "rusty water" and the increase in turbidity caused by metal fragments that have flaked off due to corrosion.

(2) To solve the above problems, facilities are often provided for adding chemicals such as rust-preventatives. These chemicals must therefore be constantly purchased and stocked, resulting in costs for both the purchase and the storage space. During blow-down of the heat exchange water bearing rust preventives, measures must be taken to minimize impacts on the environment caused by the discharge of such water.

(3) The concentration of dissolved oxygen can be reduced by deaerating the heat exchange water in order to prevent oxidation by dissolved oxygen. However, oxidation and corrosion of the metal materials cannot sufficiently be avoided by simply reducing oxygen dissolution.

(4) There are cases where algae and microorganisms proliferate in the heat exchange system, forming biological films on the liquid ends. This may cause decrease in the heat exchange efficiency and increase in resistance inside the pipes. Chemicals such as germicides must then be added, entailing increased costs and environmental problems as in the above (2).

(5) The flow rate of the heat exchange water circulating in the heat exchanger is usually set at a rate including margins such that the object of heat exchange can be cooled to below a predetermined temperature even when the object generates the maximum heat load. The flow rate is not separately controlled for discrete objects. Despite the fact that the heat radiation load amount of the objects varies widely depending on operating conditions, and that no heat is generated when the operation of the facility is stopped, it is typical in conventional systems that the heat exchange water is constantly circulated at a flow rate fixed according to the maximum heat radiation load. In other words, depending on the situation of operation, most of the heat exchange water may be circulating wastefully. Further, while the supplying temperature of the heat exchange water is usually room temperature, the exiting temperature is approximately 5° C. higher than the supplying temperature. As it is necessary to minimize the difference between the supplying and the exiting temperatures of the heat exchange water, a high flow rate of heat exchange water is presently used in conventional systems. For these reasons, in factories having many installations requiring heat exchange, a heat exchange system for circulating heat exchange water at an extremely high flow rate must be provided. In order to circulate heat exchange water at a high flow rate, the circulation line for the heat exchange water must be made wide to reduce the fluid resistance of the piping, but with certain limits. To complement this, the compressing pressure of the compressing pump is typically increased. However, power consumption of the compressing pump increases in proportion to the pump discharge rate and the number of installed pumps. Accordingly, there exist problems such as high costs and large installation space required by large-capacity pumps and pipes having large diameters, and vibrations caused by large pumps. Moreover, the influence on the environment during blowdown of a large quantity of heat exchange water certainly cannot be neglected. As described above, heat exchange water and a supplying system for the water that are environmentally benign and can maintain a stable cooling effect at high efficiency for a long period of time were not conventionally available.

SUMMARY OF THE INVENTION

The purpose of the present invention is to provide heat exchange water that prevents oxidation and deterioration of metal materials used in pipes for supplying/circulating the heat exchange water or in the liquid ends of the heat exchanger. The heat exchange water should also suppresses growth of algae and microorganisms, and eliminate detrimental effects on the environment. Another purpose of the present invention is to provide a simple heat exchange system that can retrofit in existing systems and that minimizes cost increase. A further purpose of the present invention is to perform control for optimal temperature through adjustment of the flow rate of the heat exchange water to accomplish lower flow rate and lower pressure of the heat exchange water, so as to reduce installation space and vibration due to the pump and to achieve a heat exchange system that minimizes cost increase.

According to the present invention, in a heat exchanger for cooling an object of heat exchange such as machinery, air, or liquid, a reductive water having zero or negative standard oxidation-reduction potential determined by use of the hydrogen electrode standard, is used as the heat exchange water for performing heat exchange with the object of heat exchange.

According to the above, oxidation and deterioration of metal materials used in pipes for supplying/circulating the heat exchange water or in the liquid ends of the heat exchanger can be prevented. Growth of algae and microorganisms can be suppressed, and impacts on the environment can be reduced. Further, as the reductive water can be obtained by, for example, adding hydrogen gas to water, a simple heat exchange system is provided that can retrofit existing systems and that minimizes cost increase. It is to be noted that not only hydrogen gas but also but also other reducing agents may be employed.

In addition, by controlling the flow rate of the heat exchange water (cooling water) circulating in the heat exchanger (cooling device) for cooling the object of heat exchange, the temperature of the cooling water can be controlled at a desired temperature. In this way, the cooling water circulating in the cooling device can be best tailored for the intended purpose, allowing efficient heat exchange with the object of heat exchange. Such an arrangement contributes to cost reduction.

DESCRIPTION OF PREFERRED EMBODIMENT

In the present invention, the heat exchanger for performing heat exchange between an object of heat exchange (such as machinery, air, or liquid) and the heat exchange water or cooling water may be a cooling device for cooling or a heating device for heating the object of heat exchange in various factories and laboratories. Preferably, the heat exchanger according to the present invention should better be a cooling device for cooling apparatus for manufacturing electronic components such as semiconductors and liquid crystal displays.

The heat exchange water of the present invention is only limited by the feature that it is a reductive water having zero or negative standard oxidation-reduction potential determined by use of the hydrogen electrode standard. The heat exchange water may be, without limitation, water having hydrogen dissolved therein, or water including a small amount of dissolved reducing agent other than hydrogen gas such as sodium sulfite and sodium hydrogensulfite. Hydrogen-dissolved water is preferable because the standard oxidation-reduction potential can be easily controlled by dissolving a small amount of hydrogen in the water, and because hydrogen gas has less impacts on the environment compared to other reducing agents. The water for dissolving the reducing agent may be any of tap water, river water, industrial water, filtered water obtained by eliminating particles and oxidizers such as hypochlorous acid and sodium hypochlorite from those waters, and deionized water obtained by treating those waters in water purifying apparatus to eliminate ionic and non-ionic substances. It is preferable to use deionized water to prevent system contamination especially when the water is employed as the heat exchange water in apparatus for manufacturing electronic components. Further, deaerated water is preferably used as the water for dissolving the reducing agent. Any known method can be used to perform deaeration. The preferable level of standard oxidation-reduction potential of the reductive water is −0.3V or lower when determined by use of the hydrogen electrode standard. The reductive water can be easily controlled to a desired standard oxidation-reduction potential by dissolving an appropriate amount of hydrogen in water, regardless of the dissolved oxygen concentration in the reductive water.

Figure 4:
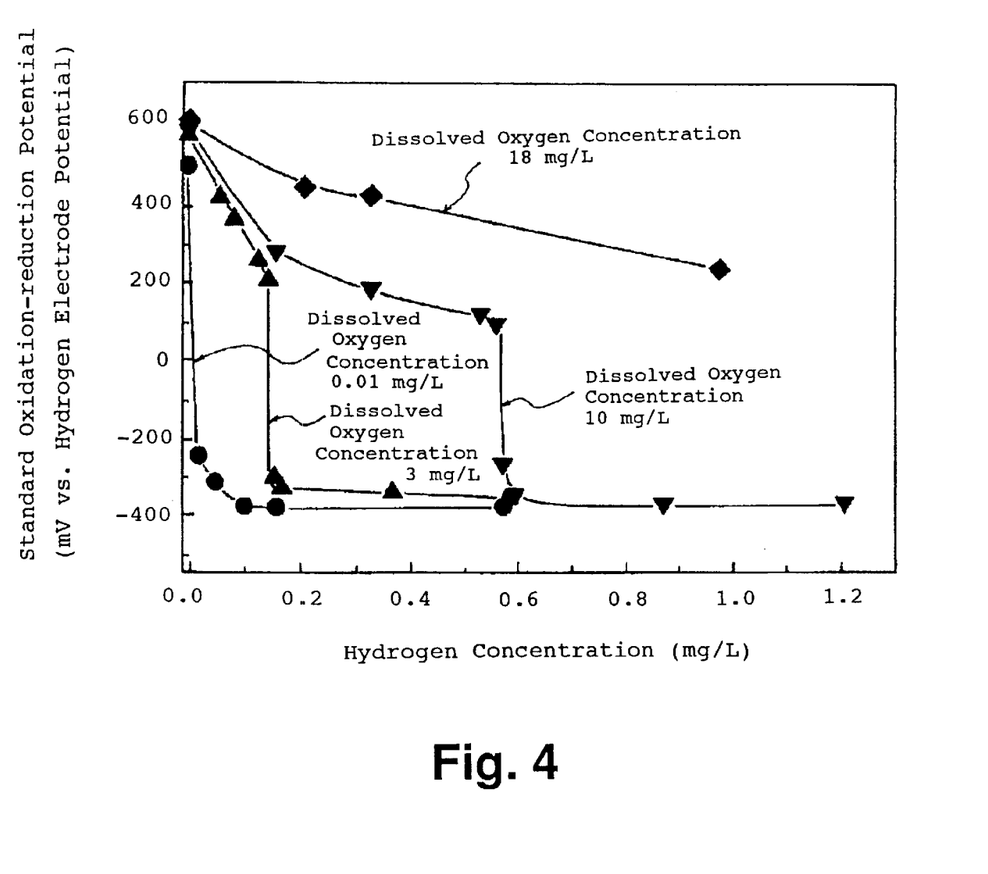
FIG. 4 is a graph illustrating the relationship between the dissolved hydrogen concentration and the standard oxidation-reduction potential.

Hydrogen-dissolved water can be obtained by dissolving into water hydrogen gas that is stored in a gas cylinder or generated by electrolysis of water. Specifically, hydrogen gas is dissolved into water such that the dissolved hydrogen concentration in water at 25° C. under 1 atm is 0.1 mg/l or higher, preferably 0.2–1.5 mg/l. The dissolved oxygen concentration of the water for dissolving hydrogen is preferably lowered in advance to 3 mg/l or lower, and more preferably to 0.1 mg/l or lower, using a known degassing device. The method for measuring the concentrations of dissolved hydrogen and dissolved oxygen in the water is not restricted to any particular method. For example, the concentrations of dissolved hydrogen and dissolved oxygen in deionized water is preferably measured using diaphragm electrodes. FIG. 4 illustrates the relationship between the dissolved hydrogen concentration and the standard oxidation-reduction potential using the dissolved oxygen concentration as a parameter. As can be seen, in a case where the dissolved oxygen concentration is 3 mg/l, the standard oxidation-reduction potential of the water may not be reliably maintained at a negative value when the dissolved hydrogen concentration is lower than approximately 0.2 mg/l.

The following methods can be used, without limitation, to dissolve hydrogen gas into water: the method of injecting hydrogen gas into water via a gas-permeable film; the method of bubbling hydrogen gas directly into the piping; the method of using a diffusing device such as a static mixer after injecting hydrogen gas; the method of introducing hydrogen gas from outside, such as introducing hydrogen gas into the upstream side of a pump that supplies ultrapure water into a gas dissolution tank, and allowing hydrogen gas to dissolve by the mixing effect within the pump; and the method of electrolyzing ultrapure water and obtaining from the cathode side the reductive water having hydrogen gas dissolved therein.

Figure 1:
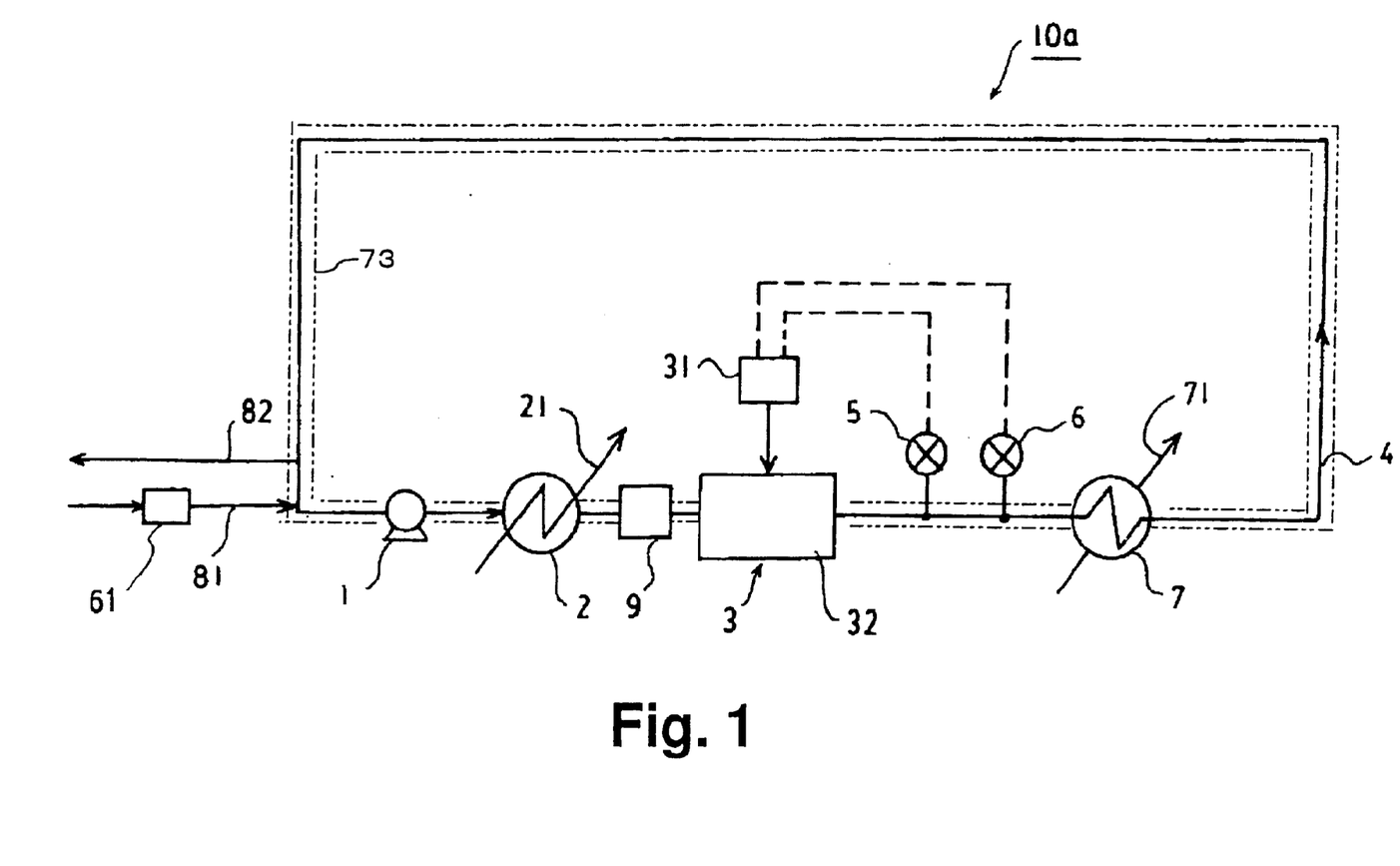
FIG. 1 illustrates a heat exchange system according to a first embodiment of the present invention.

Referring to FIG. 1, a heat exchange system according to a first embodiment of the present invention will now be explained. FIG. 1 is a diagram showing an example of the embodiment. The heat exchange system 10a comprises a circulation pump 1, a reductive water cooler 2, a deaerator 9, a reductive water preparing device 3, and a cooling device 7 for cooling an object of heat exchange 71. These components are connected by piping 4 and constitute a substantially sealed circulation system. "Substantially sealed" refers to a state which allows leakage at a level that does not obstruct the efficient operation of the present supply system. Supply piping 81 for supplying, from the outside of the circulation system, make-up water treated in a pre-treatment device 61 is connected to the inlet side of the circulation pump 1. Discharge piping 82 for partially or completely discharging circulating water in the circulation system to the outside of the system is connected upstream of the supply piping 81. A heat insulating material 73 is disposed surrounding the piping 4. The heat insulating material 73 prevents increase of the circulating water (cooling water) temperature due to the influence of the ambient temperature, allowing more efficient operation.

The pre-treatment device 61 treats the make-up water before supplying it to the circulation system. The treatment method depends on the type of make-up water, but may be performed by, without limitation, a unit process such as activated carbon adsorption, coagulation, membrane separation, ion exchange, and deaeration, or a device combining these process units. Through the pre-treatment device 61, the make-up water such as filtered water or deionized water can be obtained. The reductive water cooler 2 may be of any type that can cool the temperature of the heat exchange water from 30–40° C. to approximately 10° C. at the cooler exit. The cooler 2 may comprise, without limitation, a piece of machinery such as a heat exchanger, a cooling tower, and a chiller, or a device performing the cooling by combining such pieces of machinery. Using the reductive water cooler 2, the heat exchange water at the temperature of approximately 10° C. can be obtained. The coolant of the reductive water cooler 2 may be water or air, for example. The object of heat exchange 71 to be cooled in the cooling device 7 may be for example a heat-radiating portion of a semiconductor manufacturing apparatus.

The reductive water preparing device 3 is composed of a hydrogen gas dissolution tank 32 and a hydrogen gas generator 31. An oxidation-reduction potentiometer 5 and a dissolved hydrogen concentration meter 6 are connected do the piping between the reductive water preparing device 3 and the cooling device 7. These measuring devices are used to constantly monitor the oxidation-reduction potential and the dissolved hydrogen concentration of the reductive water, and to accordingly control the amount of hydrogen gas to be dissolved into water in the hydrogen gas dissolution tank 32. It is not shown in the figure but a controller is usually included in the above-described arrangement. The measured values of the oxidation-reduction potentiometer 5 and the dissolved hydrogen concentration meter 6 are transmitted to the controller. The amount of hydrogen gas to be supplied from the hydrogen gas generator 31 to the hydrogen gas dissolution tank 32 is then controlled according to the measured values transmitted to the controller. The oxidation-reduction potential (and/or the dissolved hydrogen concentration) of the reductive water exiting from the hydrogen gas dissolution tank 32 is thereby maintained at a predetermined level. The installation locations of the oxidation-reduction potentiometer 5 and the dissolved hydrogen concentration meter 6 are not limited to the above-described locations, and may be downstream of the heat exchanger(cooler 2). However, the installation locations are preferably upstream of the cooling device 7, as in the present embodiment. It is also possible to provide only one of the oxidation-reduction potentiometer 5 and the dissolved hydrogen concentration meter 6, and to control the amount of dissolving hydrogen gas according to the obtained measurement values.

Prior to starting of the operation of this heat exchange system 10a, the internal portions of the circulation system connected by the piping 4 are preferably sterilized by a bactericide. A known method such as the method of circulating within the system water containing available chlorine dissolved therein can be adopted as the sterilizing method.

Subsequently, while the disinfecting water is discharged via the discharge piping 82 to the outside of the system, the water treated in the pre-treatment device 61 is supplied via the supply piping 81 to the circulation system from the outside of the system, thereby replacing the disinfecting water with the pre-treated make-up water. The deaerator 9, the reductive water preparing device 3, the oxidation-reduction potentiometer 5, and the dissolved hydrogen concentration meter 6 are then turned on. The water circulating within the system is converted to reductive water having the dissolved oxygen concentration of 3 mg/l or lower, the dissolved hydrogen concentration of 0.1 mg/l or higher, and the standard oxidation-reduction potential of –0.3V or lower as determined on the basis of the hydrogen electrode standard. The reductive water is controlled to maintain these conditions.

The object of heat exchange 71 is cooled in the cooling device 7. In turn, the reductive water that received heat from the object of heat exchange 71 in the cooling device 7 is cooled by passing through the reductive water cooler 2. The reductive water cooler 2 cools the reductive water using a coolant 21 such as water or air.

When the quality of the reductive water has deteriorated after a long-term circulation, the circulating reductive water is partially or completely discharged via the discharge piping 82 to the outside of the system. The discharged amount is compensated by introducing the make-up water treated in the pre-treatment device 61 from the outside of the system via the supply piping 81.

According to the present invention, reductive water is employed as the heat exchange water for circulation in the heat exchange apparatus. The circulation system is thereby maintained under a reductive condition. Accordingly, oxidation and corrosion of metal materials of liquid ends can be reliably prevented. As it is difficult for aerobic microorganisms and algae which form biological films to grow under reductive conditions, formation of such films can be effectively suppressed. The system only requires installation of simple devices, and does not otherwise incur any expense machinery costs.

The reductive water is a hydrogen-dissolved water obtained by dissolving hydrogen gas, and has the standard oxidation-reduction potential of −0.3V or lower as determined on the basis of the hydrogen electrode standard, the dissolved oxygen concentration of 3 mg/l or lower, and the dissolved hydrogen concentration of 0.1 mg/l or higher. Use of such reductive water reliably prevents oxidation and corrosion of metal materials of liquid ends. Moreover, such reductive water having a desired level of standard oxidation-reduction potential can easily be obtained. The present system uses no chemicals that conventionally required purchasing costs, and storage space, and caused concerns about influences on the environment. This easily-obtained reductive water also serves to inhibit corrosion of materials used in the system and formation of biological films, while reducing adverse effects on the environment.

The reductive water is prepared by dissolving a reducing agent in deaerated water, and has a dissolved oxygen concentration of 3 mg/l or lower. It is therefore possible to prepare the reductive water using a reduced dissolved amount of reducing agent.

When the coolant 21 in the reductive water cooler 2 is water, it is also preferable to use the above-described reductive water as the coolant 21. This can prevent corrosion due to oxidation of metal materials and growth of microorganisms in the flow path of the coolant 21 in the reductive water cooler 2. It is further preferable to circulate the coolant 21 in a circulation system similar to that of the reductive water.

Figure 2:
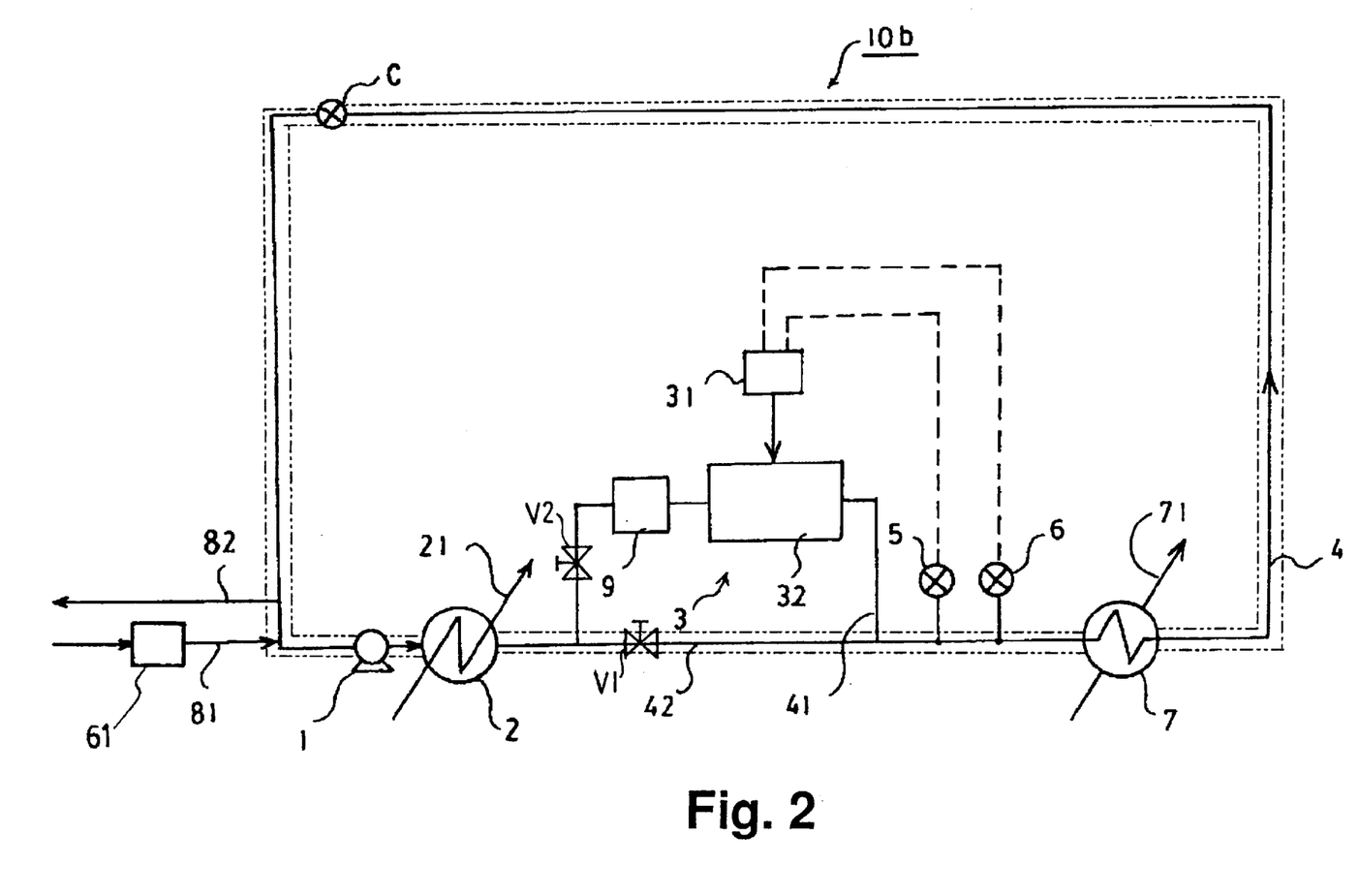
FIG. 2 shows a heat exchange system according to a second embodiment of the present invention.

Referring to FIG. 2, a heat exchange system according to a second embodiment of the present invention will next be explained. FIG. 2 is a diagram showing an example of the embodiment. Components in FIG. 2 that correspond to those in FIG. 1 are labeled with corresponding numerals. Explanation for these common components will not be repeated, and only the differing points are described below. The difference between the present embodiment and FIG. 1 is that a substantially sealed bypass piping 41 that branches from the circulation piping 4 is provided. Specifically, the bypass piping 41 is connected so as to branch from and return to the circulation piping 42 between the reductive water cooler 2 and the oxidation-reduction potentiometer 5. Furthermore, the deaerator 9 and the reductive water preparing device 3 are disposed on this bypass piping 41. Valves V1, V2 are provided in the circulation piping 42 and the bypass piping 41, respectively, in positions immediately downstream of the branching. These valves are used to control through which path to circulate the heat exchange water.

For example, by starting up the deaerator 9 and the reductive water preparing device 3 when valve V1 is closed and valve V2 is opened to circulate the heat exchange water via the bypass piping 41, reductive water can be supplied for circulation as the cooling water for the cooling device 7. The valves V1, V2 may be periodically opened and closed, or may alternatively be controlled according to the measured values of the oxidation-reduction potentiometer 5 or the dissolved hydrogen concentration meter 6. It is also possible to allow a portion of the circulating water to constantly branch off and flow through the bypass piping 41. The heat exchange system 10b according to the second embodiment offer advantages similar to those of the first embodiment. Further, as the present embodiment enables installation of a small-scale reductive water preparing device in a location branched off from the circulation system, existing heat exchange systems can be retrofitted with ease.

Figure 3:
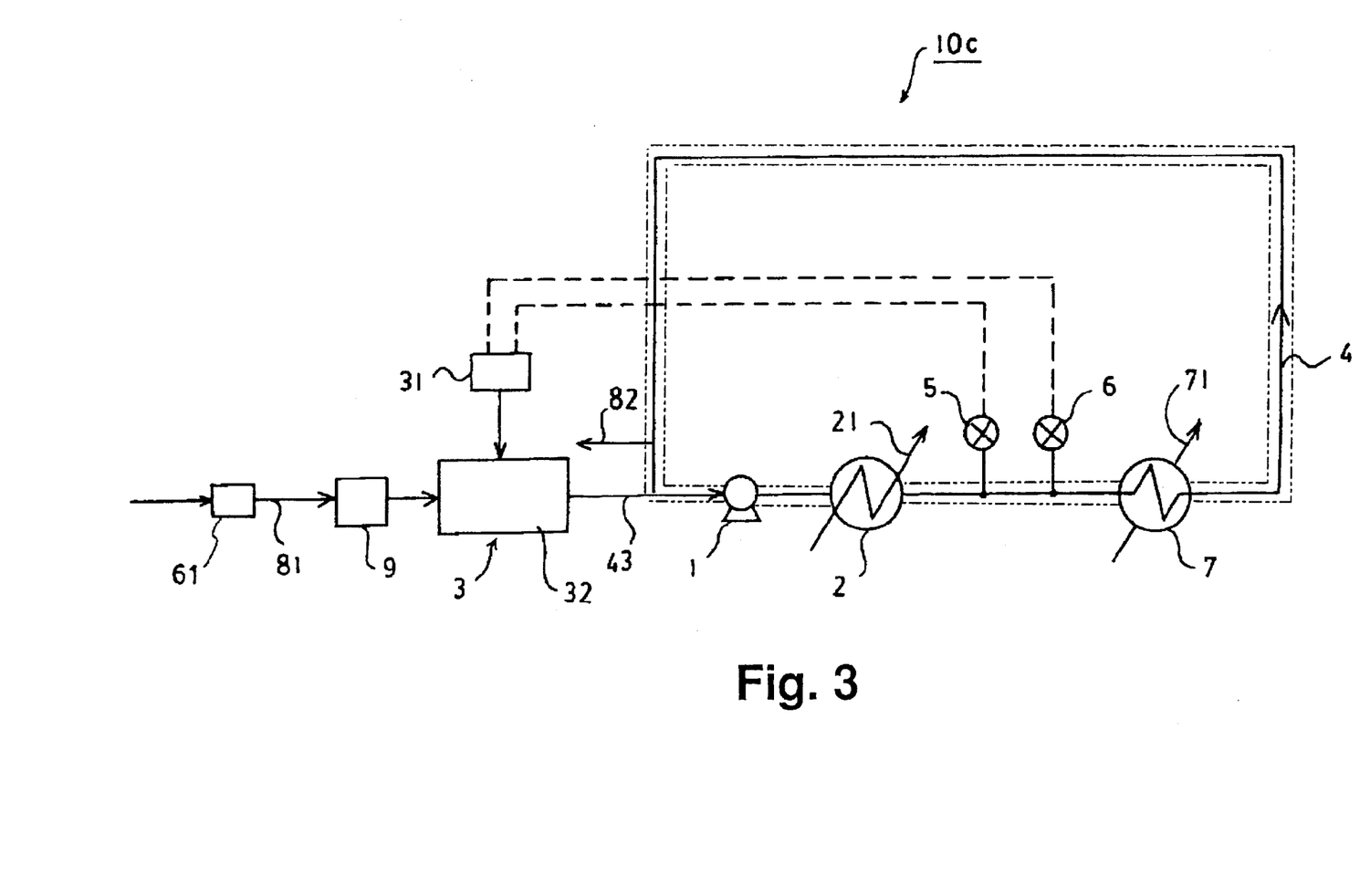
FIG. 3 shows a heat exchange system according to a third embodiment of the present invention.

Referring to FIG. 3, a heat exchange system according to a third embodiment of the present invention will next be explained. FIG. 3 is a diagram showing an example of the embodiment. Components in FIG. 3 that correspond to those in FIG. 1 are labeled with corresponding numerals. Explanation for those common components will not be repeated, and only the differing points are described below. In the present embodiment, the deaerator 9 and the reductive water preparing device 3 are not located within the circulation piping 4, but installed on external piping 43 connected to the circulation piping 4. The pre-treatment device 61 for treating the make-up water is provided before the deaerator 9, and the supply piping 81 connects the pre-treatment device 61 and the deaerator 9. According to this arrangement, reductive water is added to the circulating water in use via the external piping. The standard oxidation-reduction potential and the dissolved hydrogen concentration of the circulating heat exchange water (the circulating water) are constantly monitored using the oxidation-reduction potentiometer 5 and the dissolved hydrogen concentration meter 6 to accordingly control the dissolution amount of hydrogen gas. In this way, the standard oxidation-reduction potential of the circulating water is controlled to a desired level in a stable manner.

Figure 5:
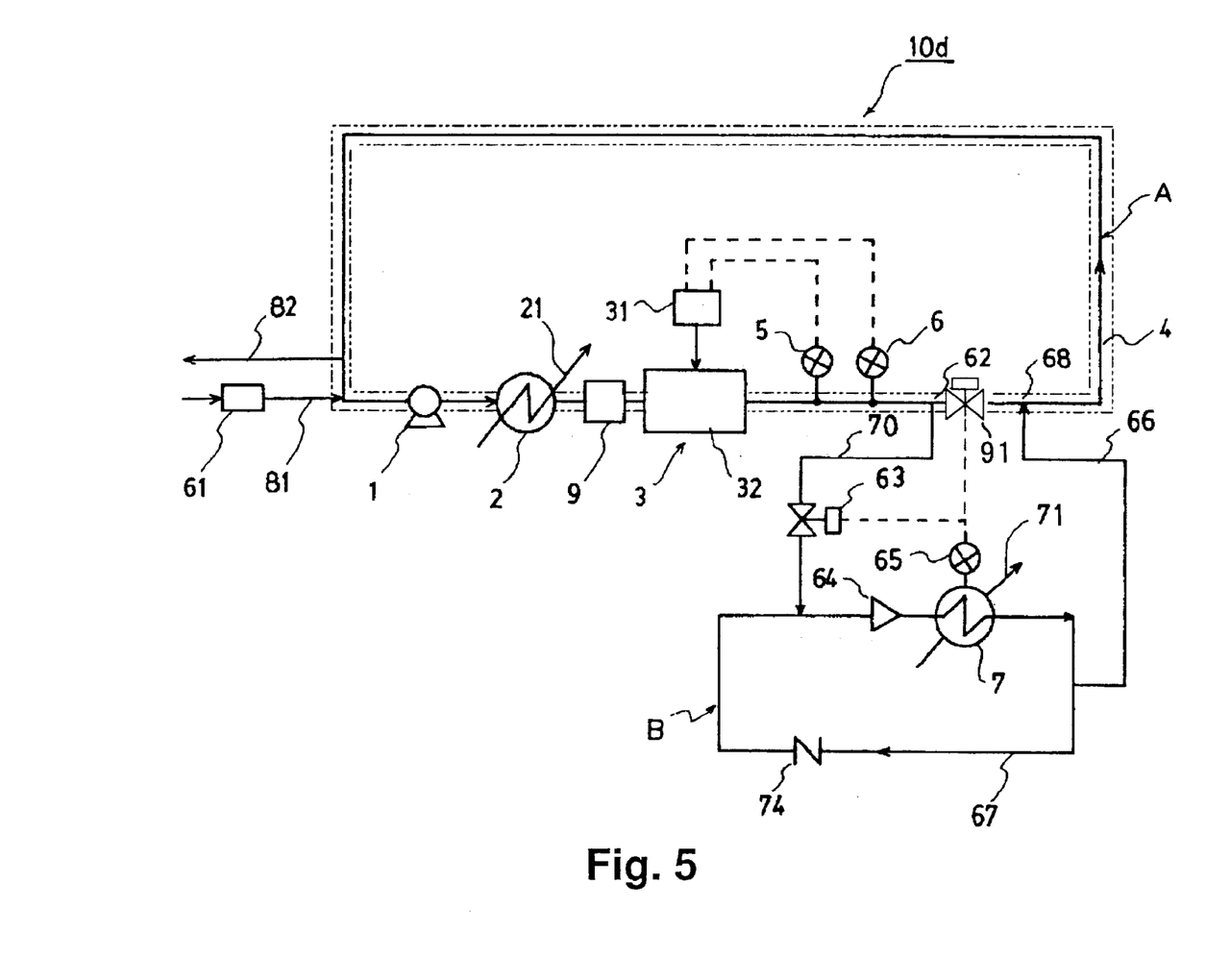
FIG. 5 shows a heat exchange system according to a fourth embodiment of the present invention.

Referring to FIG. 5, a heat exchange system according to a fourth embodiment of the present invention will next be explained. FIG. 5 is a diagram showing an example of the embodiment. Components in FIG. 5 that correspond to those in FIG. 1 are labeled with corresponding numerals. Explanation for these common components will not be repeated, and mainly the differing points are described.

Within the heat exchange system 10d of the present embodiment, a circulation system referred to as a second system A is configured in the same way as the heat exchange system 10a of FIG. 1 except that the cooling device 7 is removed from the circulation piping 4. Provided separately is a first system B comprising the cooling device 7, a pump 64 (first reductive water supply device) for supplying reductive water to the cooling device 7, and circulation piping 67 (first reductive water circulation piping) connected so as to form a circulation system with the cooling device 7 and the pump 64. Connected at positions downstream of the dissolved hydrogen meter 6 of the second system A are a reductive water supply side piping 70 for supplying reductive water to the first system B, and a reductive water exit side piping 66 for receiving reductive water from the first system B.

A flow rate adjustment valve 63 is provided on the reductive water supply side piping 70. The flow rate of the reductive water flowing into the first system B is controlled using this flow rate adjustment valve 63. The amount of reductive water supplied to the first system B is adjusted by operating this flow rate adjustment valve 63 and the valves (not shown) located at the cooling water inlet 62 and the cooling water outlet 68, resulting in adjustment of the amount of reductive water (heat exchange water) flowing into the cooling device 7. This reductive water is water cooled in the reductive water cooler 2. By adjusting the flow rate of the reductive water in the cooling device 7, the temperature of the reductive water can be controlled to a desired level.

The second system A is identical to the system of FIG. 1 except in that the cooling device 7 is removed from the circulation piping 4. The second system A comprises the circulation pump 1 for supplying reductive water to the first system B, the reductive water cooler 2 for cooling the reductive water exiting from the cooling device 7, the reductive water preparing device 3, and the circulation piping 4 connected so as to form a circulation system with the circulation pump 1, the reductive water cooler 2, and the reductive water preparing device 3. In this heat exchange system 10*d*, the temperature of the reductive water circulating in the second system A is lower than the temperature of the reductive water circulating in the first system B. The numeral 74 denotes a check valve.

In FIG. 5, the reductive water cooled to approximately 10° C. in the reductive water cooler 2 of the second system A is first supplied to the cooling device 7 of the first system B via the circulation piping 4, the cooling water inlet 62, the reductive water supply side piping 70, and the pump 64. The cooling device 7 cools, for example, heat load components requiring cooling which constitute a microwave oscillator or a dry pump. The temperature of the reductive water flowing in the cooling device 7 is constantly monitored by a temperature sensor 65. A portion of the reductive water exiting the cooling device 7 passes through the circulation piping 67, and another portion of the reductive water passes through the reductive water exit side piping 66 and enters the circulation piping 4 of the second system A via the cooling water outlet 68. When the temperature monitored by the temperature sensor 65 reaches a predetermined maximum allowable temperature or higher, the temperature signal is converted into an electric signal for transmission through circuits such as a control circuit and drive circuit. This signal is used to widened the opening of the flow rate adjustment valve 63. By widening the opening of the valve, the amount of reductive water flowing into the circulation line (the first system B) increases, thereby lowering the temperature of the reductive water flowing in the cooling device 7. When the temperature of the object of cooling becomes lower than the predetermined maximum allowable temperature, the opening of the flow rate adjustment valve is reduced to restrict the flow of the reductive water. In this way, the amount of reductive water circulated for cooling the object of cooling 71 can be constantly controlled to an optimal level. In some cases where the facility is not in constant operation, there is time when no heat load is generated. According to the present embodiment, the flow of reductive water can be almost stopped during such shutdown times, preventing wasteful use of reductive water. It is also preferable to provide a valve 91 in the circulation piping 4 at a position between the cooling water inlet 62 and the cooling water outlet 68. By providing such a valve 91, the amount of circulated water in the second circulation system A can be adjusted as desired.

When simultaneously cooling a plurality of objects of cooling 71, it is preferable to provide a corresponding system B for each object 71, and connect the plurality of systems B to the system A. According to this arrangement, reductive water can be circulated through only any one or more systems B which require reductive water.

Figure 6:
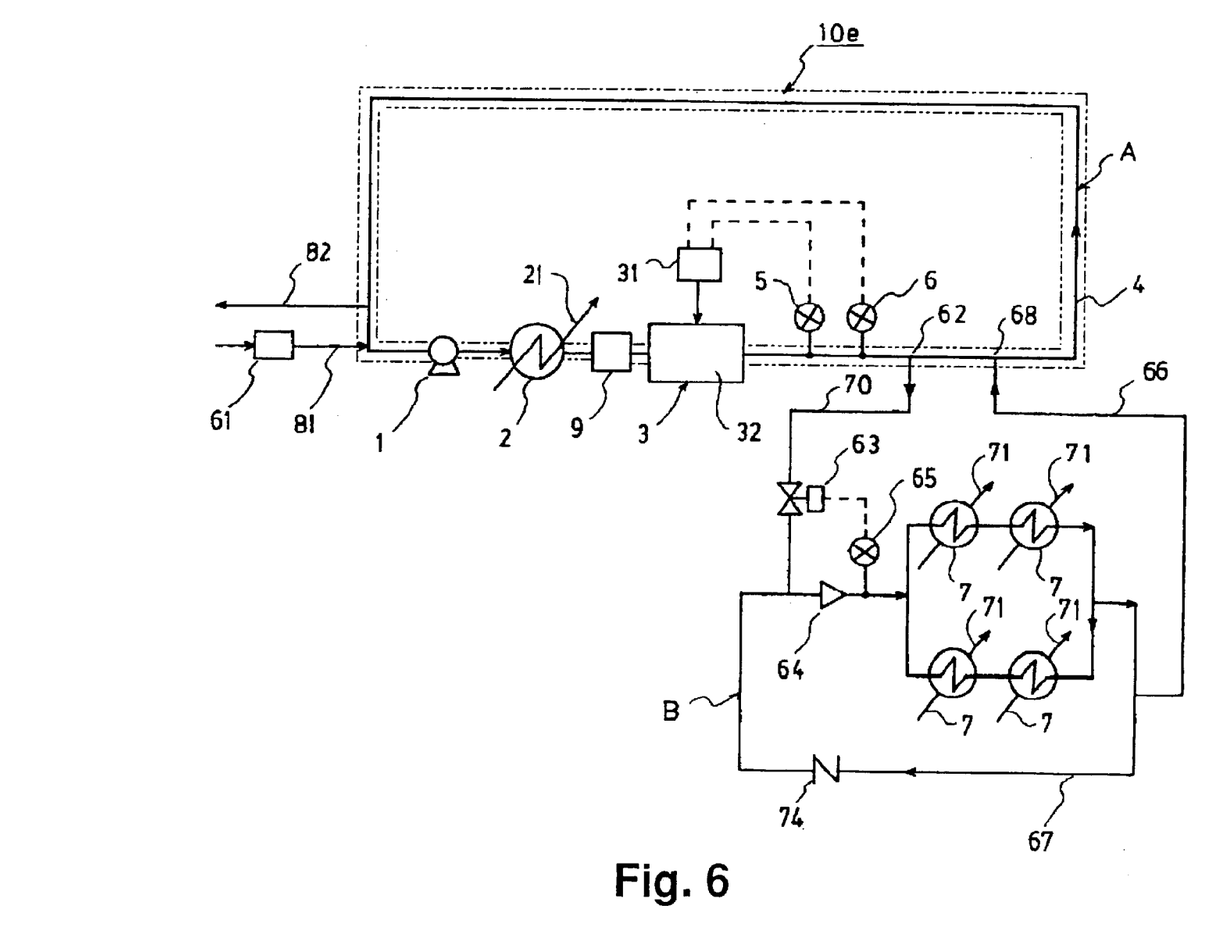
FIG. 6 shows a heat exchange system according to a fifth embodiment of the present invention.

Referring to FIG. 6, a heat exchange system according to a fifth embodiment of the present invention will next be explained. FIG. 6 is a diagram showing an example of the embodiment. Components in FIG. 6 that correspond to those in FIG. 5 are labeled with corresponding numerals. Explanation for those components will not be repeated, and mainly the differing points are described.

The heat exchange system 10*e* of the present embodiment is configured in the same way as the heat exchange system 10*d* of FIG. 5 except that the cooling device 7 in the first system B is now provided in a plural number (four). The cooling devices 7 are connected in series and in parallel. Further, the temperature sensor 65 is positioned on the piping just before the plurality of cooling devices 7, so as to monitor the temperature of reductive water flowing through that piping. Using such an arrangement and operating the valves (not shown) located at the cooling water inlet 62 and the cooling water outlet 68, reductive water at a predetermined temperature can be circulated efficiently in the plurality of cooling devices 7.

As the heat load is greatly increased in this embodiment, the flow adjustment valve 63 should be a type that can vary the flow rate to a high flow rate. According to the heat exchange system 10*e* of the present embodiment, a cooling system using an optimal amount of cooling water and having enhanced temperature uniformity can be achieved.

Figure 7:
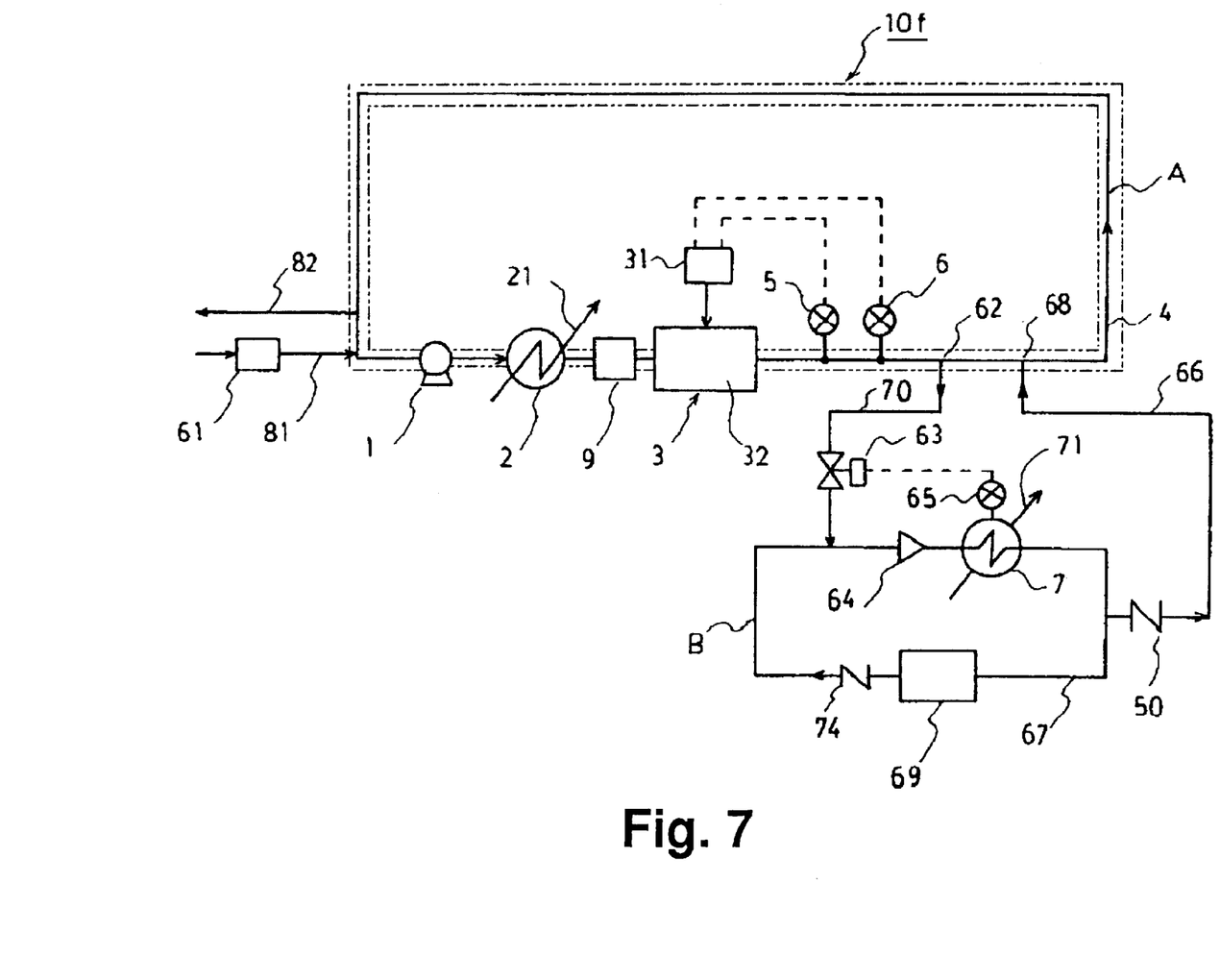
FIG. 7 shows a heat exchange system according to a sixth embodiment of the present invention.

Referring to FIG. 7, a heat exchange system according to a sixth embodiment of the present invention will next be explained. FIG. 7 is a diagram showing an example of the embodiment. Components in FIG. 7 that correspond to those in FIG. 5 are labeled with corresponding numerals. Explanation for those components will not be repeated, and mainly the differing points are described. The heat exchange system 10*f* of the present embodiment differs from that of FIG. 5 in that a buffer tank (cooling water tank) 69 is now disposed on the circulation piping 67 of the first system B in the heat exchange system 10*d* of FIG. 5. The buffer tank is connected so as to constitute a part of the sealed system, and is provided for storing cooled reductive water. Further, a check valve 50 is disposed on the cooling water exit side piping 66. This arrangement is suitable when the object of cooling must be promptly cooled by the heat exchange system 10*f*. Specifically, during a shutdown time when the facility is not in operation, the flow adjustment valve 63 is almost completely closed, while a large amount of reductive water is accumulated in advance in the buffer tank 69. When the facility is restarted, the pump 64 is operated to promptly circulate the reductive water stored in the buffer tank 69. The cooled reductive water passes through the cooling device 7, and a portion of the water subsequently flows out via the check valve 50, the cooling water exit side piping 66, and the reductive water outlet 68, into the circulation piping 4 of the second system A. The remaining portion of the water flows through the circulation piping 67. The temperature sensor 65 monitors the temperature of the reductive water flowing in the cooling device 7. As the facility continues its operation, the temperature of the reductive water increases. When the temperature exceeds a predetermined maximum allowable level, a temperature signal is supplied as a feedback to open the flow rate adjustment valve 63, thereby introducing new reductive water. As a large amount of reductive water is accumulated in advance, this system can deal with cases requiring prompt cooling, such as a rapid heat treatment furnace used in a semiconductor manufacturing process. When the operation of the facility is stopped, the pump 64 is operated while the flow rate adjustment valve 63 is fully opened, so as to accumulate cooled reductive water in the buffer tank 69 in preparation for the next facility operation. When accumulating cooled reductive water in the buffer tank 69, the check valve 50 functions to prevent reductive water on the high-temperature side from flowing into the buffer tank, so as to maintain the water temperature in the buffer tank 69 at the temperature of the cooled water entering the tank.

In the fourth, fifth, and sixth embodiments, the second system A is not limited to the above-described example. The second system A may be a circulation system configured as the heat exchange system 10*b* of FIG. 2 without the cooling device 7, or as the heat exchange system 10*c* of FIG. 3 without the cooling device 7. It is also preferable to provide a plurality of first systems B.

Figure 8:
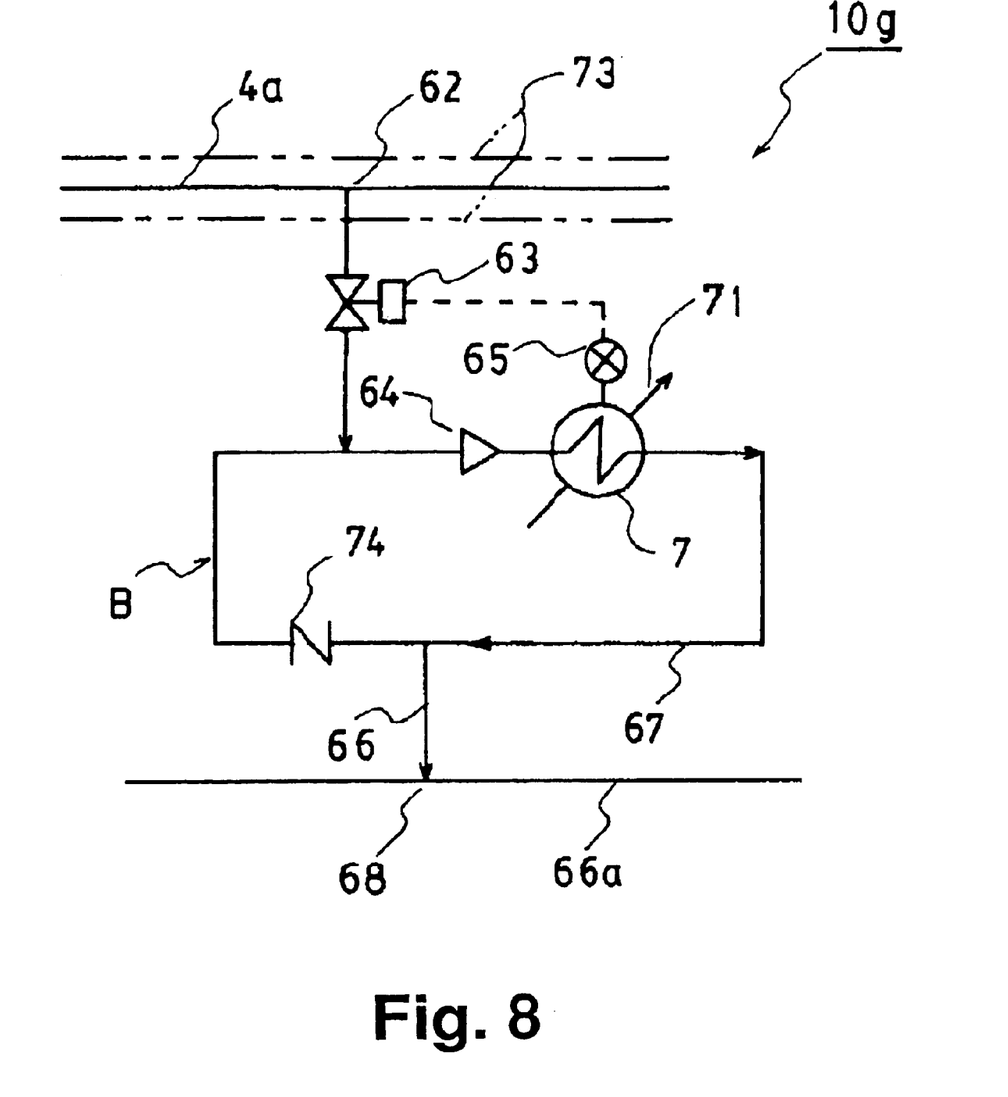
FIG. 8 shows a heat exchange system according to a seventh embodiment of the present invention.

Referring to FIG. 8, a heat exchange system according to a seventh embodiment of the present invention will next be explained. FIG. 8 is a diagram showing an example of the embodiment. Components in FIG. 8 that correspond to those in FIG. 5 are labeled with corresponding numerals. Explanation for those components will not be repeated, and mainly the differing points are described. The apparatus 10g for cooling an object of heat exchange according to the present embodiment differs from FIG. 5 in that the second system A of the heat exchange system 10d in FIG. 5 may be of any type (of cooling water supply system) as long as it can supply cooling water (heat exchange water) to the first system B. Specifically, the cooling water supply system of the present embodiment may either be a substantially sealed system or an unsealed system. The cooling water in this embodiment may be, without limitation, tap water, river water, industrial water, filtered water obtained by eliminating particle components and oxidizers such as hypochlorous acid and sodium hypochlorite from those waters, deionized water obtained by treating those waters in a water purifying apparatus to eliminate ionic and non-ionic substances, or the above-mentioned reductive water. The reductive water may be prepared as described above.

In FIG. 8, the temperature sensor 65 constantly monitors the temperature of the cooling water flowing in the cooling device 7. The cooling water cooled to about 10° C. in the cooling water cooler (not shown) within the cooling water supply system passes through the cooling water supply piping 4a, and is introduced into the cooling device 7 via the cooling water inlet 62, the flow rate adjustment valve 63, and the pump 64. A portion of the cooling water exiting the cooling device 7 flows through the cooling water circulation piping 67, while the remainder exits from the cooling water outlet 68 to enter the cooling water exit piping 66a. When the temperature monitored by the temperature sensor 65 reaches the predetermined maximum allowable temperature or higher, the temperature signal is converted into an electric signal for transmission through circuits such as a control circuit and drive circuit. This signal is used to further widen the opening of the flow rate adjustment valve 63. By further widening the opening of the valve, the amount of cooling water flowing into the circulation line increases, thereby lowering the temperature of the cooling water flowing through the cooling device 7. When the temperature of the object of heat exchange becomes lower than the predetermined minimum allowable temperature, the opening of the flow rate adjustment valve 63 is reduced to restrict the cooling water amount. In this way, the amount of cooling water for cooling the heat exchanger 7 can be constantly controlled to the minimum required level. In some cases where the facility is not in constant operation, there is time when no heat load is generated. According to the present embodiment, the flow of cooling water can be almost stopped during such shutdown time, preventing wasteful consumption of cooling water. The numeral 73 in FIG. 8 denotes a heat insulating material. By providing the heat insulating material 73 as shown, it is possible to avert influences by the ambient temperature, allowing more efficient operation. Condensation can also be prevented.

Figure 9:
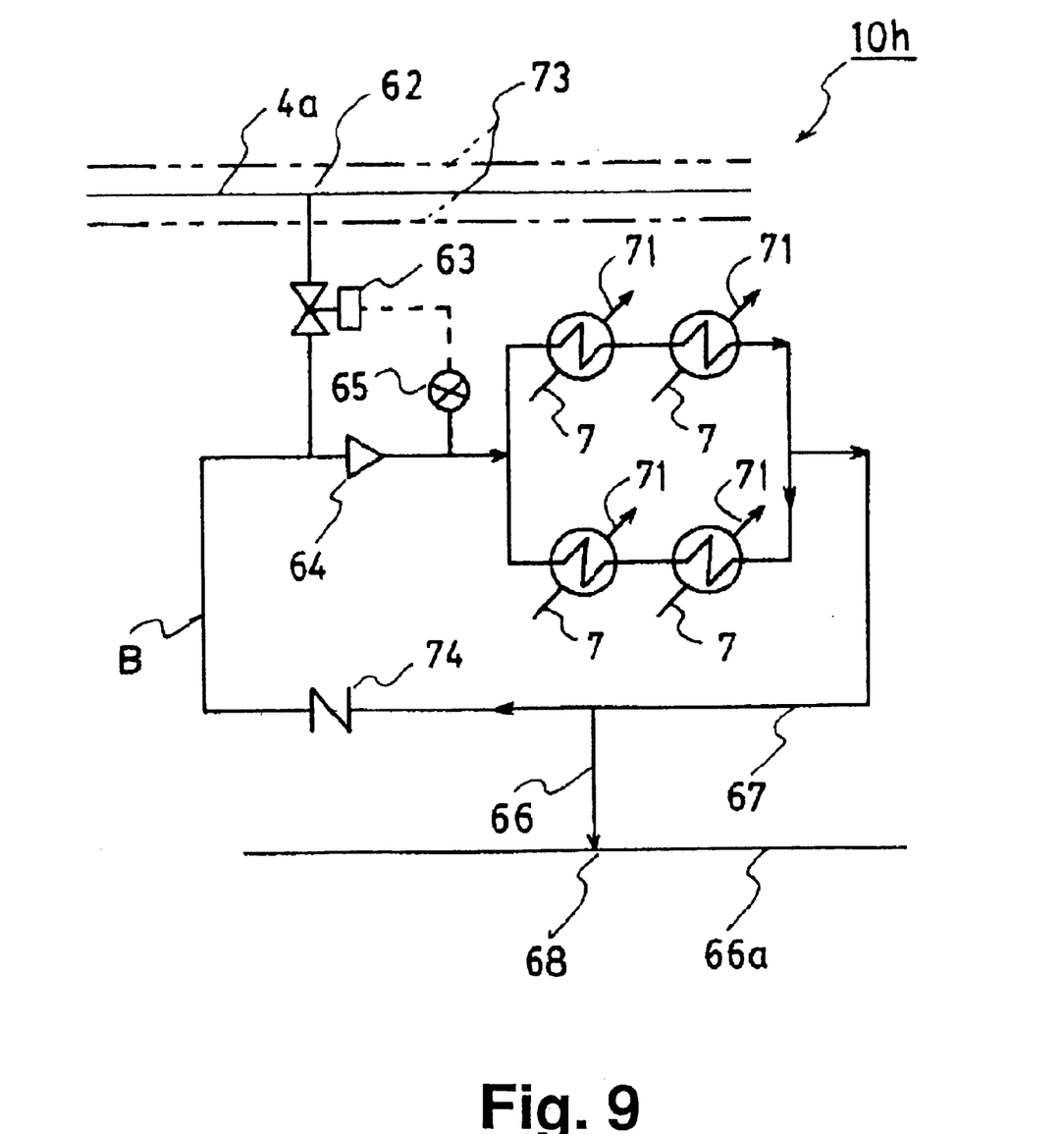
FIG. 9 shows a heat exchange system according to a eighth embodiment of the present invention.

Referring to FIG. 9, a heat exchange system according to an eighth embodiment of the present invention will next be explained. FIG. 9 is a diagram showing an example of the embodiment. Components in FIG. 9 that correspond to those in FIG. 6 are labeled with corresponding numerals. Explanation for those components will not be repeated, and mainly the differing points are described. The apparatus 10h for cooling an object of heat exchange according to the present embodiment differs from FIG. 6 in that the second system A of the heat exchange system 10e in FIG. 6 may be of any type (of cooling water supply system) as long as it can supply cooling water to the first system B. Specifically, the cooling water supply system of the present embodiment may be either a substantially sealed system or an unsealed system. The types of cooling water that can be used are the same as those listed for the above-described seventh embodiment. By implementing the apparatus 10h for cooling an object of heat exchange according to the present embodiment, a cooling system using minimum cooling water and having enhanced temperature uniformity can be realized.

Figure 10:
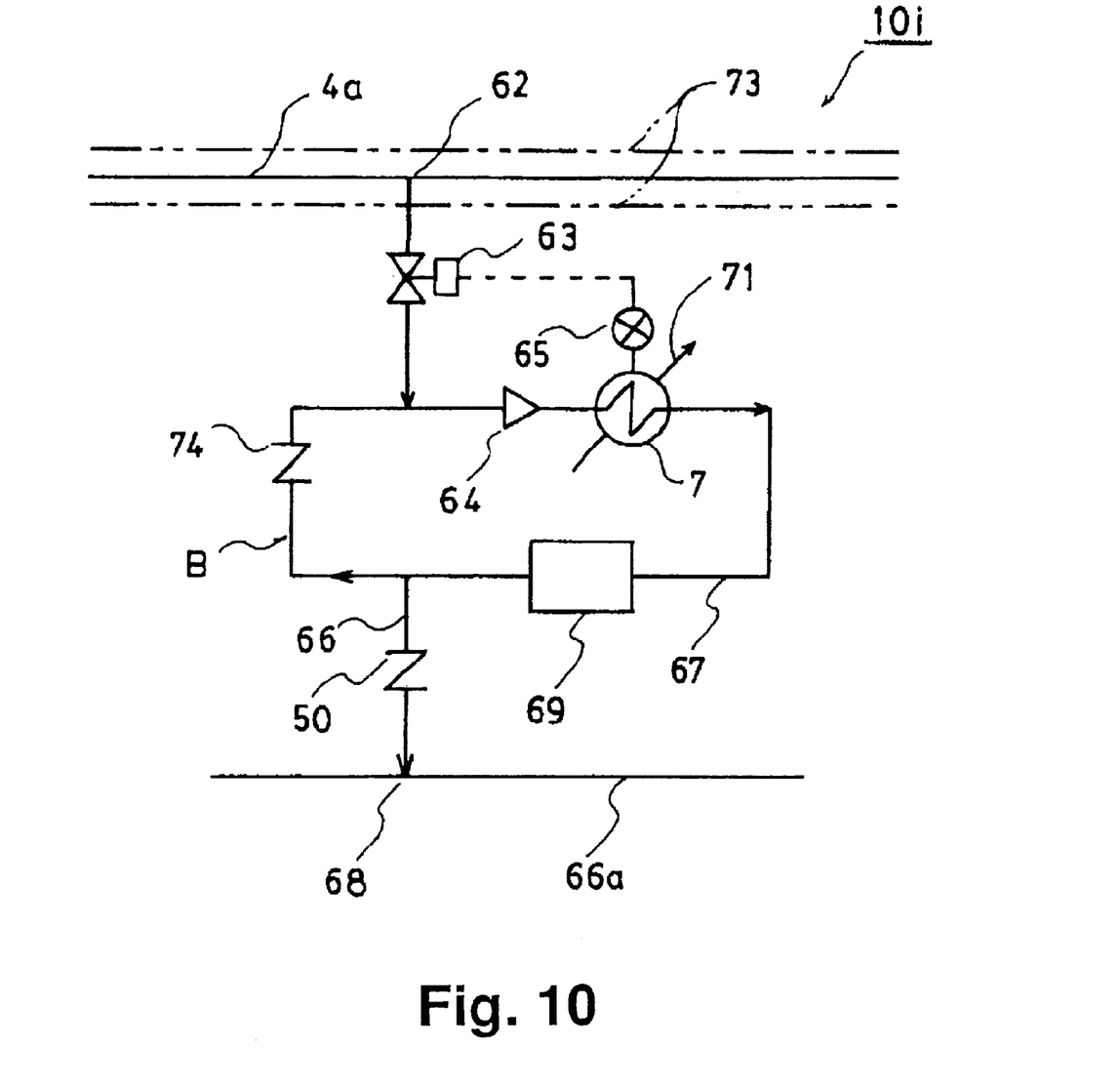
FIG. 10 shows a heat exchange system according to a ninth embodiment of the present invention.

Referring to FIG. 10, a heat exchange system according to a ninth embodiment of the present invention will next be explained. FIG. 10 is a diagram showing an example of the embodiment. Components in FIG. 10 that correspond to those in FIG. 7 are labeled with corresponding numerals. Explanation for those components will not be repeated, and mainly the differing points are described. The apparatus 10i for cooling an object of heat exchange according to the present embodiment differs from FIG. 7 in that the second system A of the heat exchange system 10f in FIG. 7 may be of any type (of cooling water supply system) as long as it can supply cooling water to the first system B. Specifically, the cooling water supply system of the present embodiment may be either a substantially sealed system or an unsealed system. The types of cooling water that can be used are the same as those listed for the above-described seventh embodiment. The apparatus 10h for cooling an object of heat exchange according to the present embodiment offers advantages similar to those of the sixth embodiment.

The circulation pump used as the reductive water supply device and the cooling water supply device can be of any known type that are normally used. However, it is preferable to use a circulation pump having a structure such that the heat exchange water or the cooling water does not come in contact with air at the sealing portion between the motor and the impeller of the circulation pump. The sealing structure at this sealing portion may be formed by introducing an inert gas into the sealing portion.

EXAMPLES

The present invention is described below in further detail using specific examples. These examples are provided only for illustrative purposes and by no way limit the present invention.

Example 1

A heat exchange system having a flow configuration as shown in FIG. 2 (the circulation system is a sealed system) was employed to perform tests according to the installation specifications and operating conditions listed below and the quality of circulating water indicated in Table 1. The results after 30 days of continuous operation are shown in Table 1. The quality of circulating water was determined by analyzing the water sampled at point C in FIG. 2.

The object of heat exchange: a heat radiating portion of a semiconductor manufacturing apparatus Piping material: stainless steel bright annealed tube; ⅜ inches diameter Total piping length: 150 m Deaeration method: vacuum deaeration using gas-permeable membrane Hydrogen dissolution method: membrane dissolution using gas-permeable membrane Circulation flow rate: 10 l/min. The entire circulating water was constantly circulated through the deaerator 9 and the hydrogen gas dissolution tank 32, with no make-up or discharge of circulating water.

Temperature of reductive water before cooling by the cooling device: 10° C.

Temperature of reductive water after cooling by the cooling device: 23° C.

Metal concentration in raw water: 0.25 μg Fe/L

Number of live bacteria in raw water: 2/mL

Circulated time: 30 days

Evaluation: examination of the condition of the piping internal surface and water quality analysis of the reductive water after 30 days

TABLE 1

| Quality of circulating water or condition of piping internal surface | Raw water | Specific examples | | | | | Comparative examples | |
|---|---|---|---|---|---|---|---|---|
| | | 1 | 2 | 3 | 4 | 5 | 1 | 2 |
| Deaeration treatment | No | No | Yes | Yes | Yes | Yes | No | Yes |
| Dissolved oxygen concentration (mg O/L) | 8.2 | 8.0 | 5.0 | 3.0 | 3.0 | 0.05 | 8.4 | 0.05 |
| Dissolution of hydrogen | No | Yes | Yes | Yes | Yes | Yes | No | No |
| Dissolved hydrogen concentration (mg H/L) | 0 | 1.1 | 1.1 | 0.3 | 1.1 | 1.1 | 0 | 0 |
| Standard oxidation-reduction potential (mV vs. NHE) | +600 | 0 | −100 | 0 | −400 | −400 | +600 | +480 |
| Metal concentration (μg Fe/L) | — | 3.6 | 3.2 | 3.5 | 0.26 | 0.26 | 213 | 119 |
| Number of live bacteria per mL | — | 20 | 11 | 18 | 2 | 2 | 4256 | 835 |
| Condition of the piping internal surface | — | Δ | Δ | Δ | ○ | ○ | X | X |

Note: in the table, the upper rows under specific examples and comparative examples indicate the quality of circulating water and conditions of deaeration and hydrogen dissolution. The bottom rows under specific examples and comparative examples indicate the results observed after 30 days of operation. The symbols denote the following.
○: no roughness on the piping internal surface
Δ: slight presence of roughness on the piping internal surface
X: distinct presence of roughness on the piping internal surface Example 2

Using the apparatus 10g for cooling an object of heat exchange having the flow configuration shown in FIG. 8, measurements were made regarding the used (consumed) amount of cooling water during a predetermined period of time. The average temperature on the cooling water supply side (T1) and the average temperature on the exit side (T2) of the cooling device 7 were also measured. For comparison, a conventional heat exchange system configured similarly to the heat exchange system 10g but without the temperature sensor 65 was operated under the same conditions. In this system for comparison, measurements were similarly made regarding the used (consumed) amount of cooling water within the same predetermined period of time, the average temperature on the cooling water supply side (T3), and the average temperature on the exit side (T4) of the cooling device 7. The results showed that, using the amount of reductive water consumed by the conventional cooling apparatus as the base amount with a value of 100, the proportional value of the amount of reductive water used by the cooling apparatus 10g having the flow configuration shown in FIG. 8 was 36. This indicates that the used amount of cooling water was reduced by more than 60%. Further, whereas (T4−T3) was approximately 8° C., (T2−T1) was approximately 0.2° C., producing only a very slight temperature difference. From this fact, it was found that the cooling apparatus 10g having the flow configuration shown in FIG. 8 can minimize the difference between temperatures on the supply side and the exit side of the cooling device, and is therefore favorable when requiring highly precise temperature control.

What is claimed is:

1. A heat exchange water for cooling an object of heat exchange, wherein said heat exchange water is reductive water having zero or negative standard oxidation-reduction potential as determined on the basis of a hydrogen electrode standard, said reductive water being prepared by degassing water and dissolving hydrogen gas in the degassed water.

2. The heat exchange water defined in claim 1, wherein said reductive water has a standard oxidation-reduction potential of −0.3V or lower as determined on the basis of a hydrogen electrode standard, and has a dissolved hydrogen concentration of 0.1 mg/L or higher.

3. The heat exchange water defined in claim 2, wherein said reductive water has a dissolved oxygen concentration of 3 mg/L or lower.

4. The heat exchange water defined in claim 1, wherein said reductive water is obtained by dissolving a reducing agent in deaerated water, has a standard oxidation-reduction potential of −0.3V or lower as determined on the basis of a hydrogen electrode standard, and has a dissolved oxygen concentration of 3 mg/L or lower.

5. The heat exchange water defined in claim 1, wherein said reductive water is used as cooling water in a heat exchanger for cooling an object of heat exchange in an apparatus for manufacturing electronic components.

6. A heat exchange system for performing heat exchange by supplying heat exchange water to a heat exchanger, comprising: reductive water;
   a heat exchanger for performing heat exchange between an object of heat exchange and said reductive water, said reductive water having zero or negative standard oxidation-reduction potential as determined on the basis of a hydrogen electrode standard, said reductive water being prepared by degassing water and dissolving hydrogen in the degassed water;
   a reductive water supply device for supplying said reductive water to said heat exchanger;
   a reductive water cooler for cooling said reductive water; and
   a reductive water circulation piping connected so as to form a circulation system with said heat exchanger, said reductive water supply device, and said reductive water cooler, wherein said circulation system of reductive water is substantially a sealed system.

7. The system defined in claim 6, further comprising:
   a bypass piping branching from an end or mid portion of said reductive water circulation piping and reconnecting to said reductive water circulation piping, wherein a reductive water preparing device for preparing said reductive water is connected at a position on said bypass piping, and said circulation system of reductive water including said reductive water preparing device and said bypass piping forms a substantially sealed system.

8. The system defined in claim 6, further comprising:

an external piping connected to said reductive water circulation piping; and a reductive water preparing device for preparing said reductive water connected in a position on said external piping, wherein said circulation system of reductive water including said external piping and said reductive water preparing device is substantially a sealed system.

9. The system defined in claim 6, wherein said reductive water circulation piping is surrounded by a heat insulating material.

10. The system defined in claim 6, further comprising:

a discharge piping for partially or completely discharging water circulating in said circulation system to the outside of said circulation system; and a supply piping for supplying make-up water for adjusting said circulating water.

11. The system defined in claim 6, further comprising:

a standard oxidation-reduction potential measuring device for measuring standard oxidation-reduction potential of said reductive water prepared in a reductive water preparing device, wherein said reductive water preparing device is controlled according to measurement results of said standard oxidation-reduction potential measuring device.

12. The system defined in claim 6, further comprising:

a dissolved hydrogen concentration measuring device for measuring dissolved hydrogen concentration of said reductive water prepared in a reductive water preparing device, wherein said reductive water preparing device is controlled according to measurement results of said dissolved hydrogen concentration measuring device.

13. The system defined in claim 6, wherein a medium that performs heat exchange in said reductive water cooler with the circulating water comprises reductive water having zero or negative standard oxidation-reduction potential.

* * * * *